United States Patent Office 3,113,159
Patented Dec. 3, 1963

3,113,159
CHLORO, IODOHEXANE FROM ETHYLENE
AND CHLORO, IODOETHANE
William D. Hoffman, Park Forest, and Emmett H. Burk, Jr., Hazel Crest, Ill., assignors, by mesne assignments, to Sinclair Research, Inc., New York, N.Y., a corporation of Delaware
No Drawing. Filed Feb. 27, 1961, Ser. No. 91,642
4 Claims. (Cl. 260—658)

The present invention relates to a process for the production of normal dihaloalkanes. More specifically, the invention relates to the production of normal chloro, iodohexanes in which the halogen atoms are attached to carbon atoms separated by at least 3 carbon atoms and at least one of the chloro and iodo groups is attached to a terminal carbon atom.

Current interest has been expressed in dihalohydrocarbons, particularly those whose halogen atoms are separated by carbon atoms, in that they have been found to be valuable intermediates for the preparation of diacids, nitriles, alcohols and other difunctional compounds all of which have utility in synthetic polymer and fiber production.

It is known that polyhaloalkanes may be reacted with ethylene in the presence of a Friedel-Crafts catalyst to produce a polyhalo product having two more carbon atoms than the original polyhalo alkane. These reactions, however, have involved polyhalo materials having a tertiary chlorine so that the resulting growth product is branch chained. Moreover, the growth products obtained in the above reactions have predominated in products containing 1 or 2 additional carbon atoms with relatively little, if any, product of greater ethylenic radical addition. In no instance to our knowledge have normal dihalohexanes been obtained in a single reaction step in any satisfactory amounts, if at all, by the reaction of ethylene with a dihaloethane in the presence of a Friedel-Crafts catalyst.

It has now been discovered that normal dihalohexanes can be obtained by reacting 1-chloro-2-iodo ethane with ethylene in the presence of a metal type Friedel-Crafts catalyst at temperatures in the range of about −30 to 50° C., preferably about −20 to 0° C. The reaction takes place at pressures ranging from atmospheric or below to about 5000 p.s.i.g. but pressures of about 0 to 500 p.s.i.g. are preferred.

The preferred Friedel-Crafts type catalyst is aluminum chloride. Other examples of suitable catalysts are strong Friedel-Crafts catalysts such as aluminum bromide, ferric chloride, titanium tetrachloride, antimony trichloride, etc. The catalysts may be used in solid form as lumps or granules, as finely divided powders or they may be deposited on supports or carriers which may be inert or may have an advantageous influence on the reaction. The amount of catalysts employed depends on the particular catalyst and reaction conditions and is sufficient to give the desired catalytic effect. Normally the amount will vary from about 0.5 to 25% based on the 1-chloro-2-iodoethane reactant.

It is preferred to dissolve the chloro-iodo compound and olefinic hydrocarbon in a substantially inert solvent such as a paraffinic hydrocarbon, for example, paraffins of 5 to 10 carbon atoms such as the normal paraffins, e.g. normal pentane; and to effect the reaction of the chloro-iodo compound with ethylene in the presence of the added solvent. The solvent chosen, of course, should be one that does not itself undergo undesirable reaction at the operating conditions employed and should not contain a tertiary hydrogen atom.

In conducting the reaction of the present invention the mole ratio of ethylene to the chloro-iodo compound employed is at least about 2:1. In one operation ethylene is introduced into the chloro-iodo compound under the reaction conditions defined above until ethylene uptake ceases or substantially ceases. Two main products are formed from the reaction. One is a chloro-iodo compound having the formula $C_6H_{12}ICl$ which may be removed by distillation. Analysis shows the dihalo product to be either a 1,5-dihalohexane or 1,6-dihalohexane. Products wherein the halogen atoms are both on terminal carbon atoms are preferred. The second product of the reaction is a high boiling chlorine-containing polymer which remains as residue after distillation.

The following examples will serve to further illustrate the present invention:

Example I

Forty grams of 1-chloro-2-iodoethane, boiling point 24° C. at 5 mm. Hg, was dissolved in 200 ml. of n-pentane (pure grade) and cooled to −20° C. To this mixture was added about 2.0 grams of aluminum chloride. The temperature of the reaction mixture was allowed to rise to about −5° C. before ethylene was introduced. After ethylene uptake ceased, the mixture was poured into cold hydrochloric acid. The layers were separated and the organic layer washed and dried.

Part of the unreacted starting material was recovered by chilling the mixture in Dry-Ice acetone. The solid chloroiodoethane was removed by filtration and the filtrate distilled. After removal of the remainder of the starting material, a fraction was collected which boiled from about 75 to 85° C. at 1.5 mm. Hg. A high boiling residue was left behind and was found to contain some halogen. Analysis of the material boiling at 75°–85° C. at 1.5 mm. indicated that it had a refractive index of 1.5132 at 26° C. and its empirical formula was found to be $C_6H_{12}ICl$.

Example II

A two liter 4-necked flask was charged with 1500 ml. of n-pentane. To this was added 300 g. of 1-chloro-2-iodoethane (B.P. 97° C. at 19.3 mm.). The reaction flask was cooled to −25° C. while being purged with nitrogen. Fourteen grams of anhydrous aluminum chloride was added. Ethylene (C.P.) was then introduced and the temperature of the flask was allowed to rise to about −10 to −6° C. Ethylene was added over a period of 2 hours. A total of 66 g. of ethylene was absorbed.

The n-pentane and recovered starting material were removed by distillation. The higher boiling portion was distilled on a spinning band column at a pressure of 9.3–9.8 mm. Hg. Although some decomposition occurred, a fraction boiling from about 77° C. to 80° C. was collected. Approximately 38 g. of the dark colored material was recovered. A wash of the material with 5% $NaHSO_3$ removed all the color and the material was found to be stable at room temperature.

A series of tests and experiments were carried out to identify this material. An elemental analysis indicated that the amount of iodine was low for the $C_6$ compound but this can be explained by the loss of iodine during distillation. Theory for $C_6H_{12}ICl$; C, 29.23; H, 4.91; I, 51.48; Cl, 14.38. Found C, 29.35; H, 4.91; I 47.7, Cl, 14.9.

Analysis by infra-red indicated that the compound did not contain any branching. Also, the spectra of the compound did not compare well with that of 1-iodo-2-chlorohexane.

A portion of the product, 13 g. was dehydrohalogenated according to a procedure published by R. Ciola and R. L. Burwell, J. Org. Chem., 23, 1063 (1958). Approximately 2 g. (45% yield) of a mixture of hydrocarbons was recovered. The mixture was found to contain mainly trans-1,4-hexadiene (47% by infra-red analysis). Besides this, there was evidence for the cis-1,4-hexadiene and some conjugated diene. The total amount of vinyl olefin was 76%.

A portion of this material was fractionated on a VPC column and collected in a cold trap. Both mass spectrographic analysis and infra-red analysis identified this material as a non-branched $C_6$ diene, probably 1,4-hexadiene which would arise from either a 1,5-dihalide or a 1,6-dihalide.

We claim:

1. A process for preparing normal chloro, iodohexane in which the carbon atoms to which the chloro and iodo groups are attached are separated by at least 3 carbon atoms and at least one of the chloro and iodo groups is attached to a terminal carbon atom which comprises reacting ethylene with 1-chloro-2-iodoethane said ethylene being employed in a molar ratio of at least about 2:1 in the presence of a metal Friedel-Crafts catalyst at a temperature of about $-30°$ to $50°$ C.

2. The process of claim 1 wherein the catalyst is aluminum chloride.

3. The process of claim 2 where n-pentane is employed as a solvent for the 1-chloro-2-iodo-ethane.

4. The process of claim 2 wherein the temperature employed is about $-20$ to $0°$ C.

References Cited in the file of this patent

Schmerling: J.A.C.S., vol. 67, pp. 1152–54 (1945).